US011299560B2

(12) United States Patent
Casalini et al.

(10) Patent No.: US 11,299,560 B2
(45) Date of Patent: Apr. 12, 2022

(54) ELASTOMERIC IONOMERS FOR ADDITIVE MANUFACTURING

(71) Applicant: The Government of the United States of America, as represented by the Secretary of the Navy, Arlington, VA (US)

(72) Inventors: Riccardo Casalini, Hyattsville, MD (US); James Hemmer, Fribourg (CH); Brian Mason, Monterey, CA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/781,643

(22) Filed: Feb. 4, 2020

(65) Prior Publication Data
US 2020/0247914 A1    Aug. 6, 2020

Related U.S. Application Data

(60) Provisional application No. 62/800,737, filed on Feb. 4, 2019.

(51) Int. Cl.
| | |
|---|---|
| *C08C 19/42* | (2006.01) |
| *C08C 19/36* | (2006.01) |
| *B33Y 80/00* | (2015.01) |
| *B33Y 70/00* | (2020.01) |

(52) U.S. Cl.
CPC ............. *C08C 19/42* (2013.01); *C08C 19/36* (2013.01); *B33Y 70/00* (2014.12); *B33Y 80/00* (2014.12)

(58) Field of Classification Search
CPC . C08C 19/28; C08C 19/26; C08F 8/44; C08F 8/42; C08F 36/06; C08F 136/06; C08F 236/06; C08F 279/02; B33Y 10/00; B33Y 70/00; B33Y 70/10
See application file for complete search history.

(56) References Cited

U.S. PATENT DOCUMENTS

| | | | | |
|---|---|---|---|---|
| 3,878,265 | A * | 4/1975 | Shimamura | C08L 51/04 525/76 |
| 4,174,332 | A * | 11/1979 | Honig | C09D 5/4473 204/500 |
| 5,096,943 | A * | 3/1992 | Hashimoto | C08J 3/215 523/333 |
| 5,362,806 | A * | 11/1994 | Ebner | C08C 19/28 430/281.1 |
| 9,717,954 | B2 * | 8/2017 | Chen | A63B 37/0078 |

(Continued)

OTHER PUBLICATIONS

Choi et al., "Molecular Volume Effects on the Dynamics of Polymerized Ionic Liquids and their Monomers" Electrochimica Acta 175 (2015) 55-61.

(Continued)

*Primary Examiner* — Robert C Boyle
(74) *Attorney, Agent, or Firm* — US Naval Research Laboratory; Joseph T. Grunkemeyer

(57) ABSTRACT

Disclosed is a method of: providing a solution having a solvent, a polybutadiene, and an acrylate; and functionalizing the polybutadiene with the diacrylate to produce an ionic polymer. The polymer may be useful as an additive manufacturing binder.

8 Claims, 10 Drawing Sheets

(56) References Cited

U.S. PATENT DOCUMENTS

2002/0128091 A1* 9/2002 Jackson ............ B29B 7/005
473/351

OTHER PUBLICATIONS

Grady, "Review and Critical Analysis of the Morphology of Random Ionomers Across Many Length Scales" Polym. Eng. & Sci. 48 (2008) 1029-1051.
Grindy et al., "Control of hierarchical polymer mechanics with bioinspired metal-coordination dynamics" Nat. Mat. 14 (2015) 1210-1217.
Hemmer et al., "Dynamics of Novel Polybutadiene Ionomers" J. Polym.Sci. B Polym. Phys. 57 (2019) 1074-1079.
Lu et al., "The morphology of zinc dimethacrylate reinforced elastomers investigated by SEM and TEM" European Polymer Journal 41 (2005) 577-588.
Neal et al., "Enhancing Mechanical Performance of a Covalent Self-Healing Material by Sacrificial Noncovalent Bonds" J. Am. Chem. Soc. 2015, 137, 4846-4850.
Oh et al., "Studies of Peroxide Curing of Polybutadiene/Zinc Diacrylate Blends by Fast FT-IR Imaging" Rubber Chemistry and Technology (2000) 73 (1): 74-79.
Weiss et al., "Rheological behavior of oligomeric ionomers" J. Rheol. 53(1), 191-213 Jan./Feb.(2009).
Zhang et al., "Dynamics of associative polymers" Soft Matter, 2018, 14, 2961-2977.
Zhang et al., "Perspective: Ionomer Research and Applications" Macromol. React. Eng. 2014, 8, 81-99.

* cited by examiner

ELASTOMERIC IONOMERS FOR ADDITIVE MANUFACTURING

This application claims the benefit of US Provisional Application No. 62/800,737, filed on Feb. 4, 2019. The provisional application and all other publications and patent documents referred to throughout this nonprovisional application are incorporated herein by reference.

TECHNICAL FIELD

The present disclosure is generally related to ionic polymers.

DESCRIPTION OF RELATED ART

Ionomers are polymers with a small fraction (few percent) of ionic groups covalently bonded to the polymer backbone as pendant moieties (Brady, *Polym. Engin. Sci.* 48, 1029-1051 (2008)). The presence of the ionic bonds can have profound effects on bulk properties and on the polymer dynamics in a manner similar to covalent bonds. The main difference between these two interactions is that the latter creates permanent chemical bonds while the former creates physical bonds that are transitory in nature. Thus for times shorter than the ionic bond lifetime ($t<<t_c$) the system behaves as if it were covalently bonded, while at longer times ($t>>tc$) the polymer behaves like a free chain. The physics of ionomers tends to be much more complex than that of classical polymers because of added complications such as: (i) the ionic bond lifetime is dependent on the external conditions such a temperature or mechanical stress and (ii) unlike covalent bonds ionic bonds are reversible.

In the literature there is a considerable interest in ionomers due to their electrical and mechanical properties (Choi et al., *Electrochimica Acta* 175, 55-61 (2015); Grindy et al., *Nat. Mat.* 14, 1210-1216 (2015); Zhang et al., *Macromol. React. Engin.* 8, 81-99 (2014); Neal et al., *J. Am. Chem. Soc.* 137 4846-4850 (2015); Weiss et al., *J. Rheol.* 53, 191-213 (2009)). Similarly to their chemical counterparts, above a certain level of association, physical bonds (i.e. ionic bonds) can induce a sol-gel transition. This is defined as a physical sol-gel transition to distinguish it from the chemical sol-gel transition induced by covalent bonds (Rubinstein et al., *Polymer Physics*, Oxford University Press, Oxford, UK (2003)). The chemical gel is a solid in which the chain can move only locally, conversely, due to the transitory nature of the ionic bonds the physical gel is a solid only for time shorter than the typical lifetime of physical bond and thus large scale rearrangements of the chains are possible at long times. Moreover, the ability of physical bonds to break and reform during different conditions of strain or temperature evidently complicates the physics of ionomers relative to that of covalent networks. The lifetime of an ionic bond is generally inversely proportional to the strength of the interaction; thus it can be controlled by substituting anions and cations (e.g. different metal ligands) (Zhang et al., *Soft Matter* 14, 2961-2977 (2018)). In some case the lifetime of the interactions can be hard to measure experimentally because they can be longer than a typical experiment.

Zinc diacrylate/dimethacrylate is a commonly used as an additive to reinforce butadiene rubbers. However, the zinc diacrylate in these systems is heterogeneous in particulate form (Lu et al., *Eur. Polym. J.* 41, 577-588 (2005); Oh et al., *Rubber Chem. Technol.* 73, 74-79 (2000)).

BRIEF SUMMARY

Disclosed herein is a method comprising: providing a solution comprising a solvent, a polybutadiene, and an acrylate; and functionalizing the polybutadiene with the diacrylate to produce an ionic polymer.

BRIEF DESCRIPTION OF THE DRAWINGS

A more complete appreciation will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

An overall goal disclosed herein is to circumvent the existing problems of using covalently cross-linked elastomers in additive manufacturing by the use of ionomers as starting materials which can be covalently cross-linked in a second step after printing. Ionomers are elastomers in which the crosslinks are formed by ionic group aggregates. Ionic bonds, unlike covalent bonds, can break (under high temperature and/or high shear) and reform, thus ionomers can be directly 3D printed without need of chemical modification. However, ionomers' mechanical modulus is lower than conventional elastomers, and have a tendency to creep so their use is more limited than traditional elastomers. This issue that can be solved by a second step of covalent crosslinking.

Additive manufacturing (i.e. 3D printing), offers new opportunities for the assembling of complex structures. However, in the case of additive manufacturing applications, the use of traditional elastomers is not straightforward since the chemical crosslinking has to occur after the extrusion from the printing head. Disclosed herein are elastomers that are suitable for addictive manufacturing. The materials address the current needs for new binder systems suitable for additive manufacturing with improved performance as well as with geometries not currently obtainable with current processes.

The physics of ionomers based on a low molecular weight polybutadiene (PB) modified by zinc acrylate moieties and other acrylates is disclosed herein. The zinc diacrylate is homogeneous and covalently bound to the polymer backbone. It is found that the presence of the ionic bonds has a strong effect on the mechanical properties of the PB inducing a sol-gel transition, while surprisingly many thermodynamic and dynamic properties remain unchanged.

Figure 1:
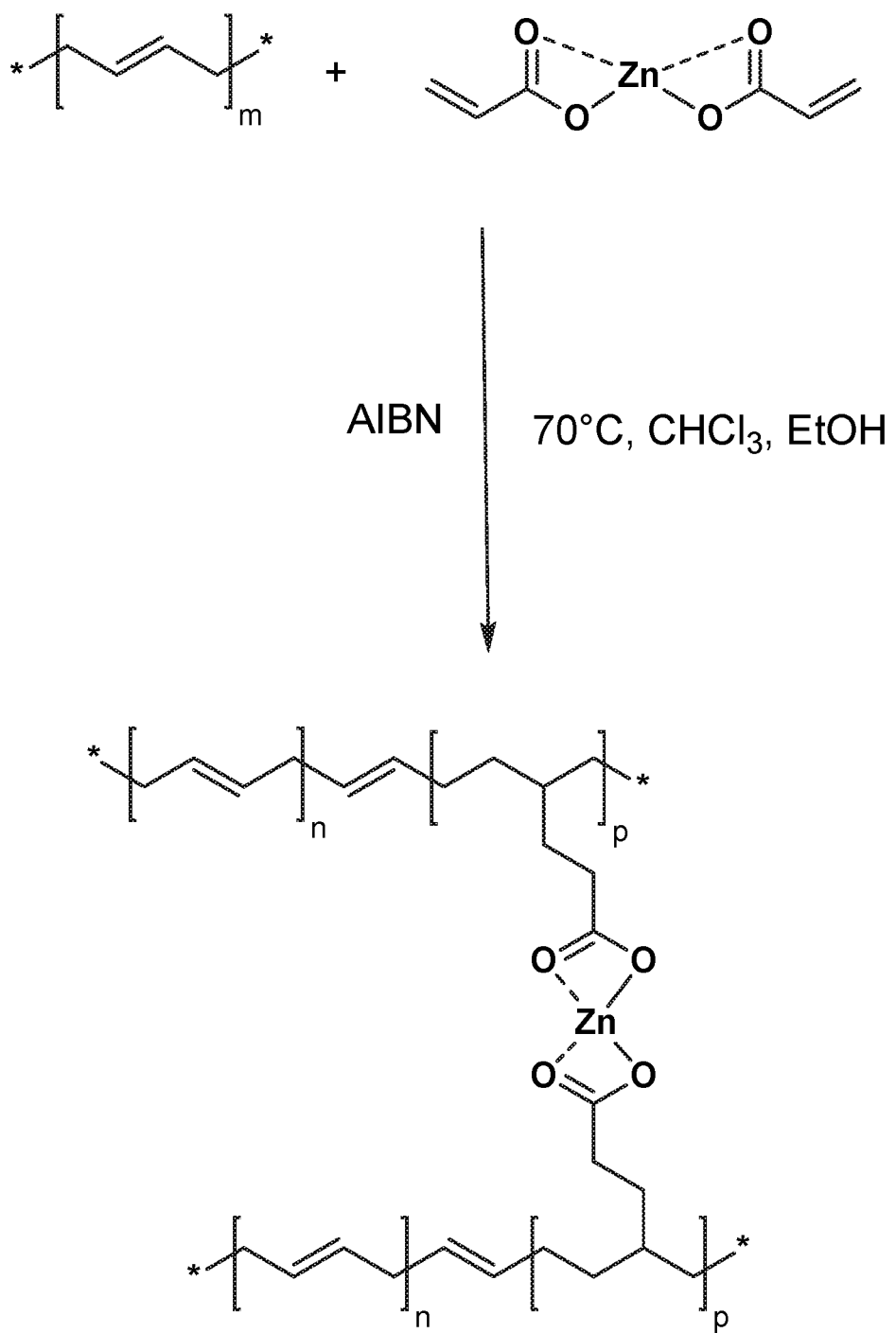
FIG. 1 shows a schematic of the chemical reaction using zinc acrylate.

The polymer is made from a solution of a polybutadiene and an acrylate. The PB is functionalized with the acrylate by addition of the double bond of the acrylate to a double bond of the PB. FIG. 1 shows a reaction scheme using zinc acrylate. Since zinc acrylate is a diacrylate, the functionalization creates an ionic crosslink between PB chains. Magnesium acrylate is another suitable diacrylate.

Figure 2:
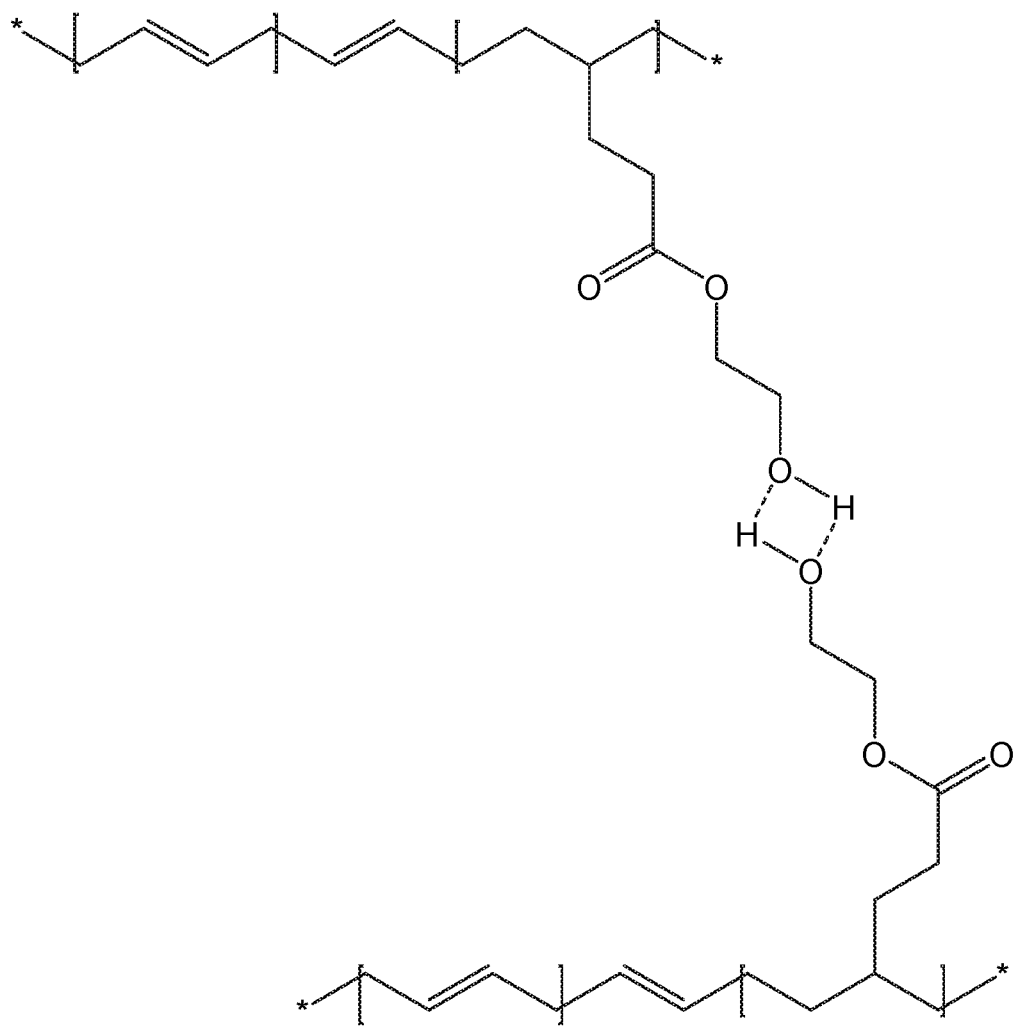
FIG. 2 shows an ionic polymer made with hydroxyethylacrylate.

As used herein, the term ionic polymer includes polymers with crosslinks formed from hydrogen bonds. This is the case where the acrylate is, for example, hydroxyethylacrylate. This ionic polymer is shown in FIG. 2.

The solvent may be any solvent in which the functionalization proceeds. Suitable solvents include, but are not limited to, a mixture of chloroform and ethanol. Once the functionalization is complete, the solvent may be evaporated, leaving a purified ionic polymer. The ionic polymer may have any number of ionic crosslinks per chain, such as up to 3.

The ionic polymer may then be combined with a second crosslinker to produce a printing composition. This printing composition may be extruded to form an article of a desired three dimensional shape. The ionic polymer may then be crosslinked with the second crosslinker to maintain the shape.

The following examples are given to illustrate specific applications. These specific examples are not intended to limit the scope of the disclosure in this application.

PB ionomers (iPBs) were synthesized by functionalizing a low molecular weight polybutadiene ($M_w$=2800, 80% 1,4-PB, 20% 1,2-PB) with zinc acrylate (Sigma Aldrich 98% purity). The synthetic procedure and structural characterization are described in details elsewhere (Subramanian, *J. Polym. Sci. A Polym. Chem.* 37, 4090 (1999)). The resulting acrylate-functionalized PB was isolated under vacuum and repeatedly precipitated to remove the (low) possibility of excess zinc diacrylate, and any initiator. Unlike the starting polymer, iPBs have only limited solubility in methylene chloride or chloroform and have a higher viscosity than the starting material. However, if a small amount of p-toluenesulfonic acid is added, the polymers readily dissolve. For example in the case of the ionomer with the highest 1.9% Zn, a 40% excess of acid added to a ionomer solution in methylene chloride/ethanol 6.5/1 with a ionomer concentration of 44 mg/mL makes the ionomer soluble. This indicates that the increase of viscosity of iPBs is due not to chemical crosslinks but rather to the presence of ionic crosslinks.

Differential scanning calorimetry (DSC) was performed using a TA instruments Q100 DSC with a standard cooling rate of 10 K/min. For thermogravimetrical analysis (TGA) the samples were heated in a TA instruments Q500 up to a temperature of 970 K with a heating rate of 20 K/min in both nitrogen and air atmosphere.

Dynamic mechanical measurement employed an Anton Paar MCR 502 rheometer, using a frequency range of $10^{-2} \leq \omega(\text{rad/s}) \leq 10^2$. Cone and plate geometries with different radii (8, 25, and 50 mm) and cone angles (1°, 2°, or 4°) were used for the characterization of different dynamical ranges (smaller radius close to $T_g$). Strain amplitude sweeps were measured for all samples to verify that the measurements were made in the linear response region, and a strain, $\gamma$, 0.5%<$\gamma$<1% was used.

Dielectric relaxation spectroscopy was carried out using a Novocontrol Alpha analyzer. The electrode diameter was of 16 mm with a Teflon spacer of 50 μm. During the measurements the samples were under vacuum in a closed cycle helium cryostat.

Figure 3:
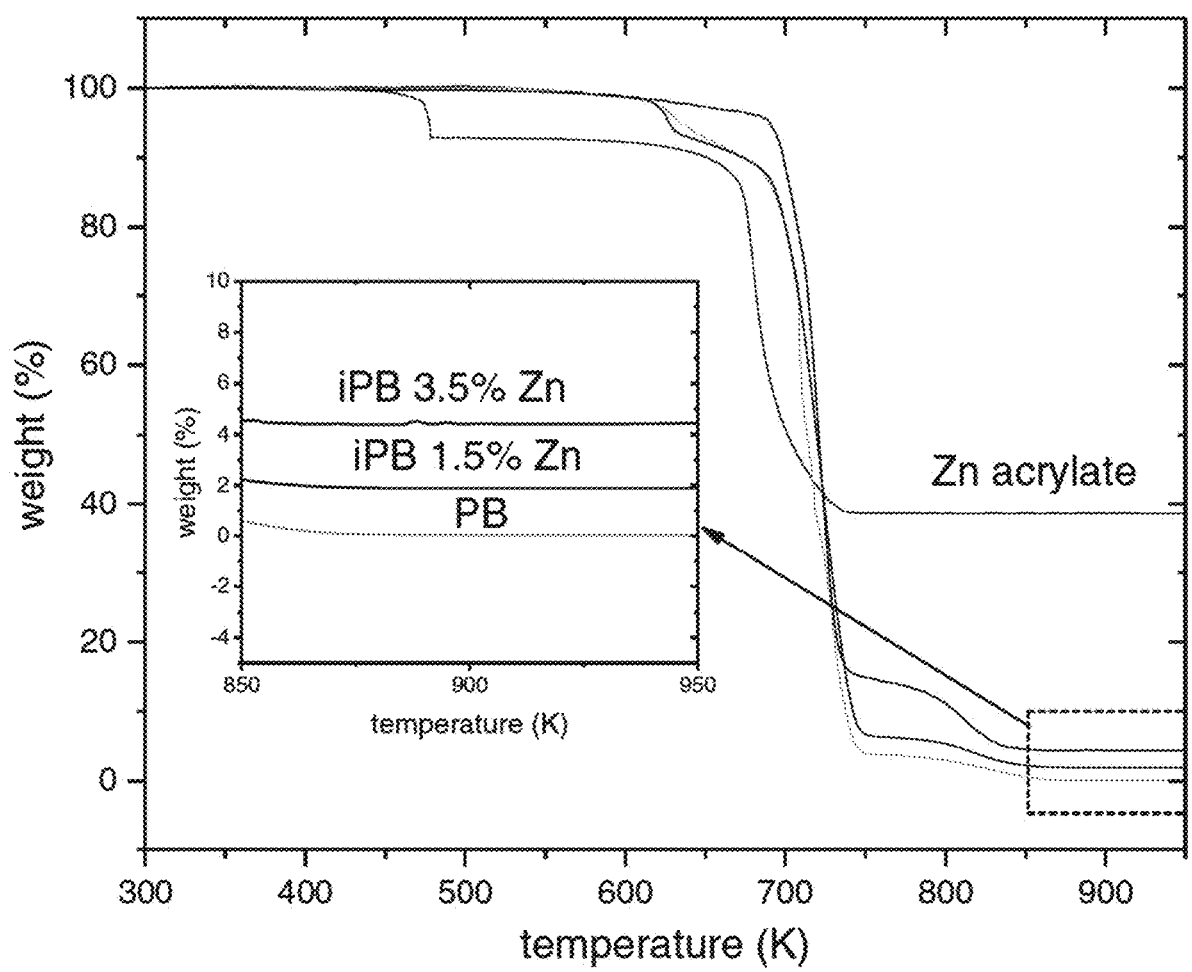
FIG. 3 shows a TGA of the neat PB, two Zn-crosslinked iPB, and zinc acrylate in air. The inset shows a detail of the high-temperature behavior evidencing the formation of Zn oxide.

Thermogravimetric analysis—Thermogravimetrical measurements of the precursor polymer and of two representative ionomers are shown in FIG. 3. The presence of the ionic crosslinks doesn't have any apparent effect on the thermal stability of the PB which mostly degrades above 600 K. From the residual weight at high temperature (T>900K) it is possible to determine the percentage content of Zn (and thus the average number of crosslinks per chain) in the iPBs taking into account that the residual for neat PB (which is very close to 0%) and that Zn oxide is stable to those temperatures. To determine more accurately the amount of Zn the TGA measurements were performed with a similar protocol but in air to assure a full conversion of the zinc crosslinker to zinc oxide. This procedure was validated by heating the zinc acrylate monomer. The percentage content of Zn is reported in Table 1.

TABLE 1

$T_g$ from DSC and number of ionic crosslinks per chain, n, versus % Zn

| Zn [%] | $T_g$ [K] | n |
|---|---|---|
| 0% | 188.9 ± 0.5 | 0 |
| 0.8% | 188.9 ± 0.5 | 0.7 |
| 1.5% | 189.1 ± 0.5 | 1.4 |
| 2.7% | 189.3 ± 0.5 | 2.8 |

Figure 4:
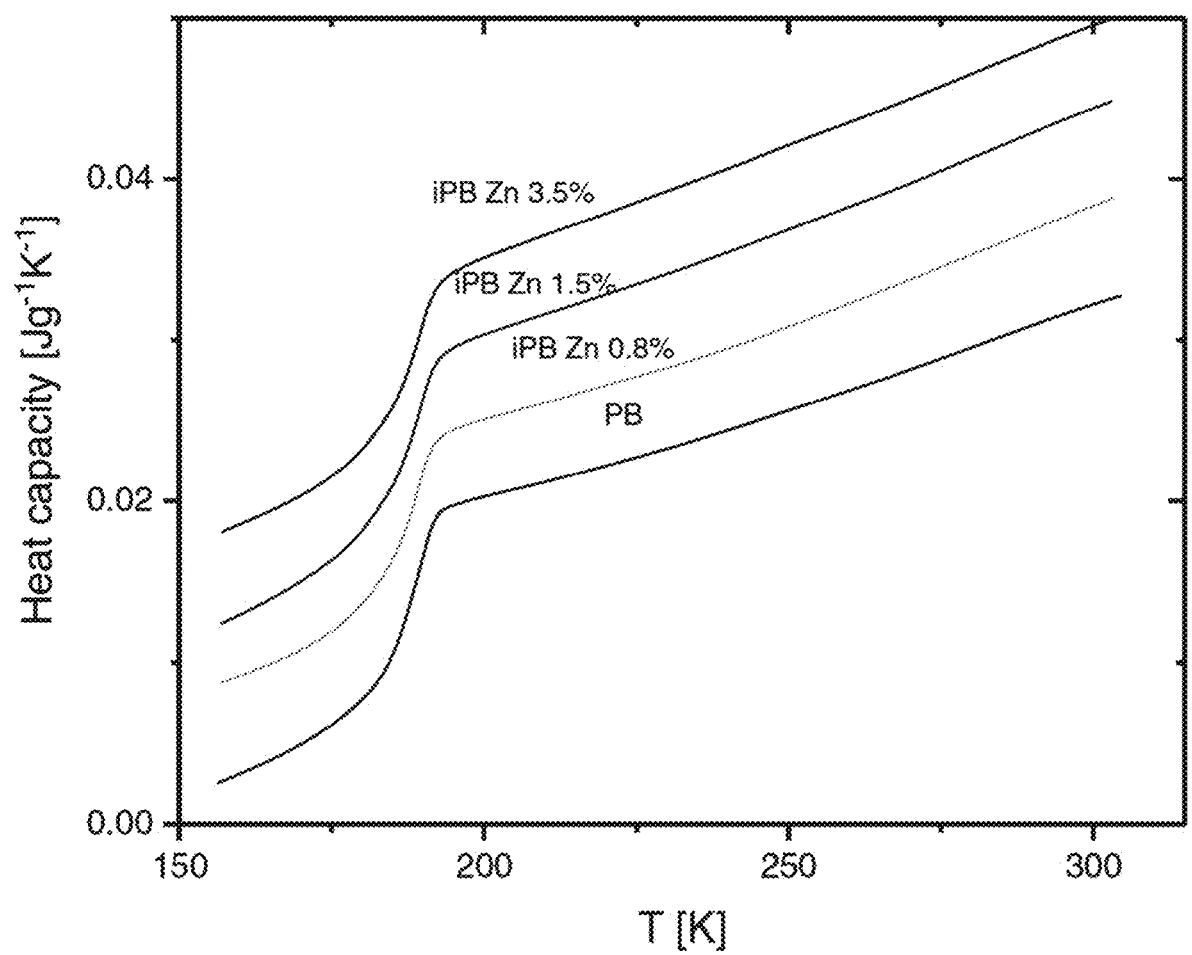
FIG. 4 shows DSC measurements of the neat PB and three iPB ionomers with different amounts of ionic groups. The measurements were done at a cooling rate of 10 K/min. The glass temperature, $T_g$, values determined from these scans are reported in Table 1. Little change to the $T_g$ is observed in the PB functionalized with the ionic groups. A constant was added to the data to separate them along the Y axis.

Differential Scanning Calorimetry—DSC measurements for both the neat PB and ionomers with varying amount ionic groups are shown in FIG. 4. The DSC scans show that the glass transition temperature (Table 1) varies little, only increasing slightly with the increasing number of ionic groups (about 0.4 K for the iPB with 2.7% Zn, a change barely larger than the experimental error). No additional glass transition or other type of transition (melting or crystallization) was observed at higher temperatures than in the reported scan. The presence of multiple glass transitions has been reported for other ionomers (Eisenberg et al., *Introduction to Ionomers*; Wiley, New York (1998)). However, in this case the clear increase of the viscosity is not accompanied by major changes to the DSC scan.

Figure 5:
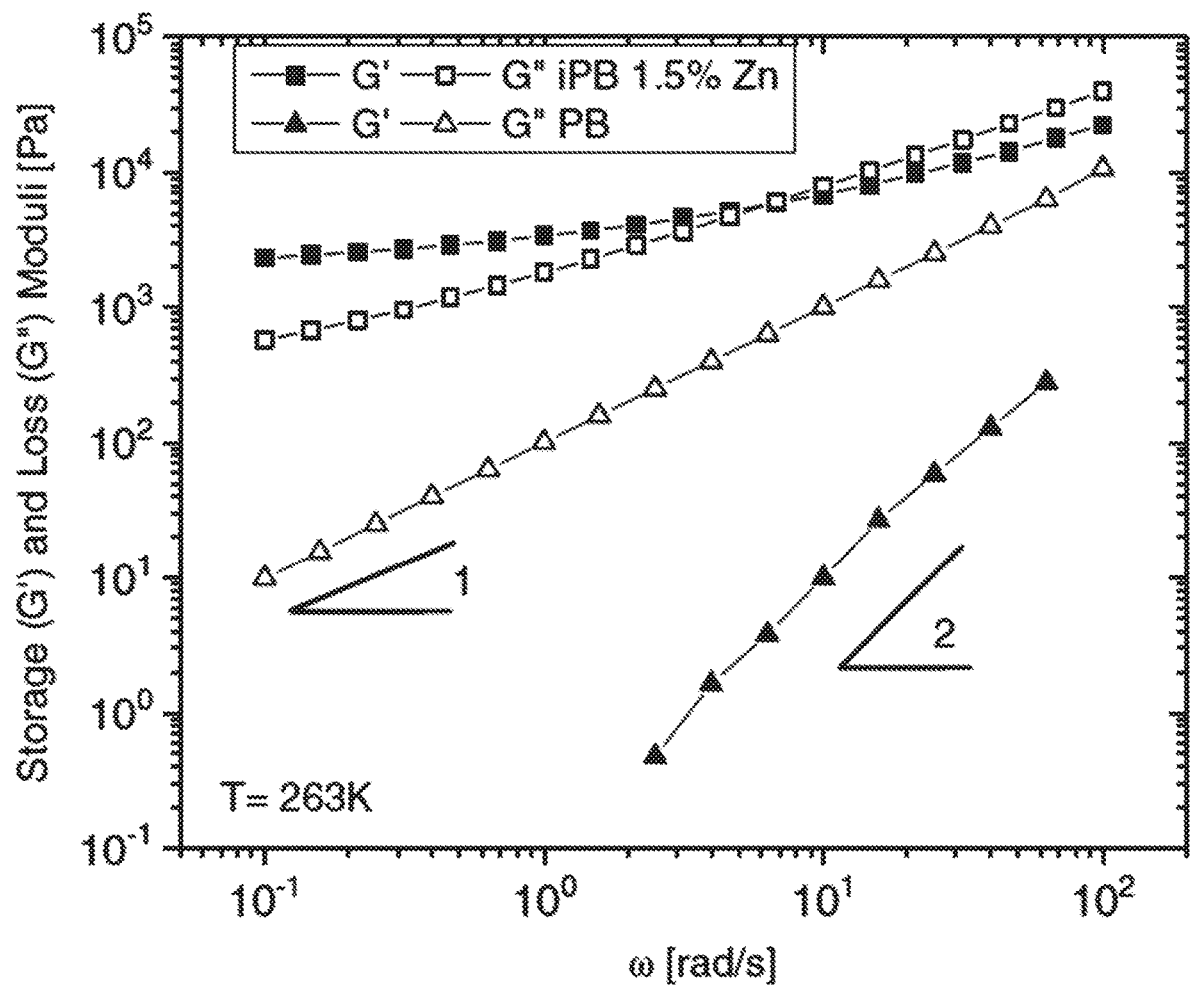
FIG. 5 shows Storage (G') and loss (G") moduli versus angular frequency of neat PB (triangles) and iPB ionomer with 1.5% Zn (square) at T=263 K.
Figure 6:
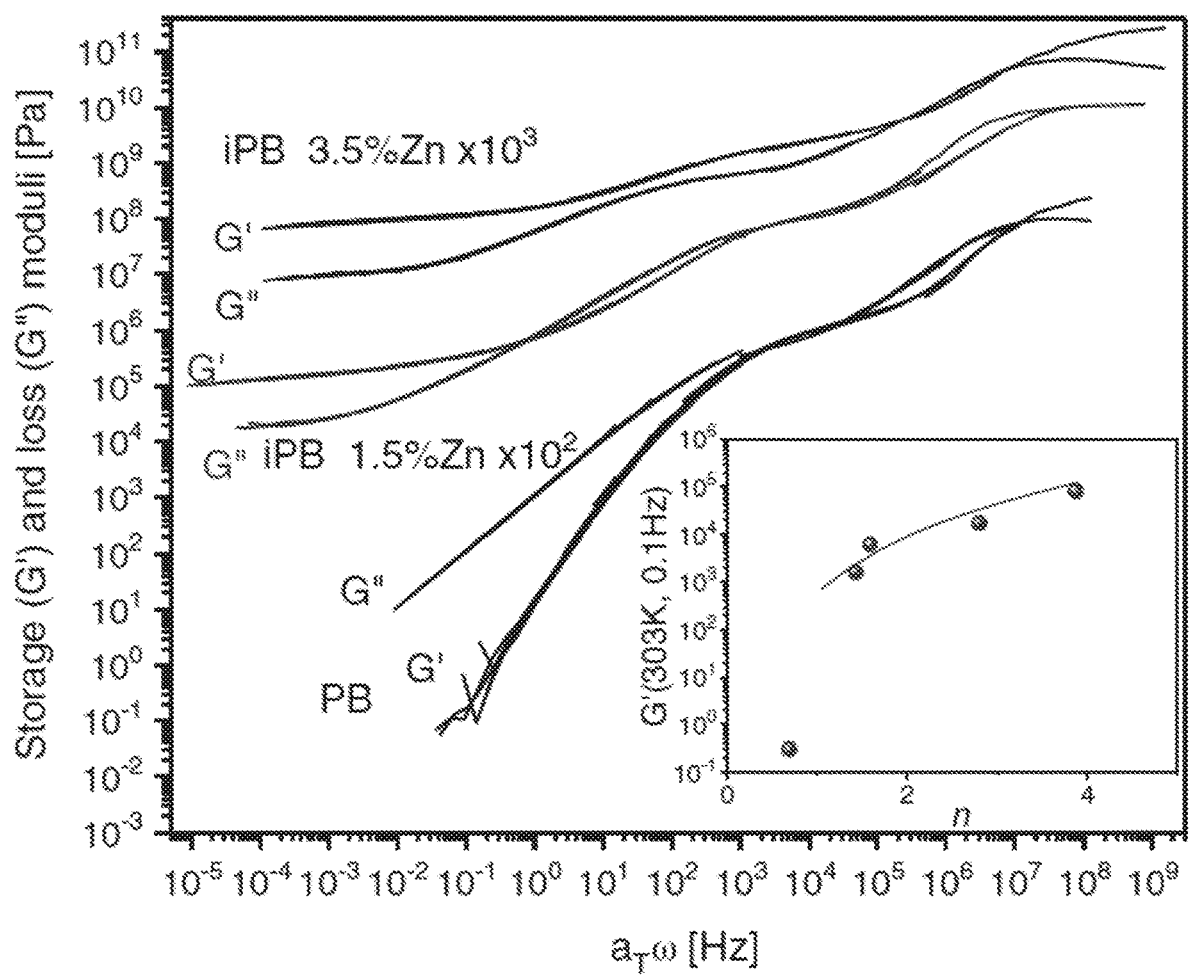
FIG. 6 shows master curves of PB and of two iPB ionomers obtained from the G' and G" spectra at varying temperatures (data for the ionomers are rescaled to avoid superposition). In the insert, the storage modulus at 303 K and ω=0.1 Hz is plotted versus the number of associated monomers per chain, n (G'[303 K] data for two additional ionomers with Zn=1.7% and Zn=2.7% are included in insert). The solid line is the fit with a power law behavior for the data with n>1, which is above the gelation threshold.

Rheological measurements—The shear modulus $G^*(\omega)=G'(\omega)+iG''(\omega)$ of neat PB and iPB ionomers was measured as a function of the angular frequency over a broad range of temperature. The ionic crosslinks introduced by the zinc acrylate groups in the PB chain have a profound effect on the mechanical properties of PB, which is evident in the change of the frequency behavior of $G'(\omega)$ and $G''(\omega)$. Because of the low molecular weight of the PB, there are no entanglements. At temperatures well above the glass transition temperature, the neat PB has the typical behavior of a Newtonian fluid with $G'(\omega) \propto \omega$, $G''(\omega) \propto \omega_2$, and $G''(\omega) < G'(\omega)$ (FIG. 5). In contrast, at the same temperature, $G^*(\omega)$ of the iPB ionomer with 1.5% Zn (that corresponds to an average of 1.5 associated monomers per chain) shows a very different behavior, at low frequency $G'(\omega) \approx G'_0$ and $G''(\omega) \approx G''_0$ where $G'_0$ and $G''_0$ are constants and $G'_0 > G''_0$. The behavior of the iPB ionomer with 1.5% Zn is typical of a polymer network even if no covalent crosslinks are present in this case, because of the large association energy. When the average number of associated monomers per chain is larger than unity (which in this case correspond to Zn %>1.1%) almost all chains are connected to the network (Das et al., *Appl. Mater. Interfaces* 7, 20623 (2015); Roland, *Viscoelastic Behavior of Rubbery Materials*; Oxford Press: Oxford, UK (2011)). $G'_0$ increases with the number of crosslinks per chain n. To show this $G'$ ($\omega=0.1$ Hz, T=303 K)$\approx G'_0$ was plotted versus n (FIG. 6, inset). The point n=1, is the condition at which there is a network involving all the chains. In the plot of the plateau modulus $G'_0$ versus n, a change in behavior in correspondence of n=1 is apparent. For n>1 the behavior can be approximated with $G'_0 \propto \varepsilon^v$ where v=3.9±1 This behavior differs from what is expected for common networks in which $G'_0$ is expected to scale with the inverse of the molecular weight of the strand between crosslinks (Das et al., *Appl. Mater. Interfaces* 7, 20623 (2015); Tanaka et al., *J. Nonnewton. Fluid Mech.* 43, 273 (1993)), and thus should be proportional to n. This deviation could be an indication that more than a single crosslink forms per each Zn ion, while in the calculation above to determine n from the weight percentage of Zn only a single crosslink between two chains was considered. In other ionomers at high temperature, a decrease of G' is observed due to the dissociation of the ionic bonds (i.e., decrease of $t_c$ at high T). However this behavior was not observed in the investigated range of T for the iPBs. Thus the lifetime of the ionic bonds for studied iPB was always longer than the experimental time, and for the investigated range of temperature (and strain), the crosslinks act as covalent crosslinks and not as "sticky" crosslinks.

By introducing a shift factor $a_T$ to renormalize the frequency of the storage and loss moduli spectra at different temperatures, the master curves shown in FIG. 6 were obtained. The different behaviors of the neat PB and the modified iPB described above are even more evident at the lowest frequency (high temperature) part of the master curves.

All $G''(\omega)$ master curves in the limit of high frequency ($a_T \omega \sim 10^7$) show a peak, which is related to the glass transition of the different materials. The fact that the peak is present at the same temperature for all master curves is consistent with the small change of $T_g$ found by DSC measurements. The behavior of $G'(\omega)$ in the glass is very similar for all materials with a glassy modulus $G''(\omega) \approx G_S \sim 200$ MPa.

Figure 7:
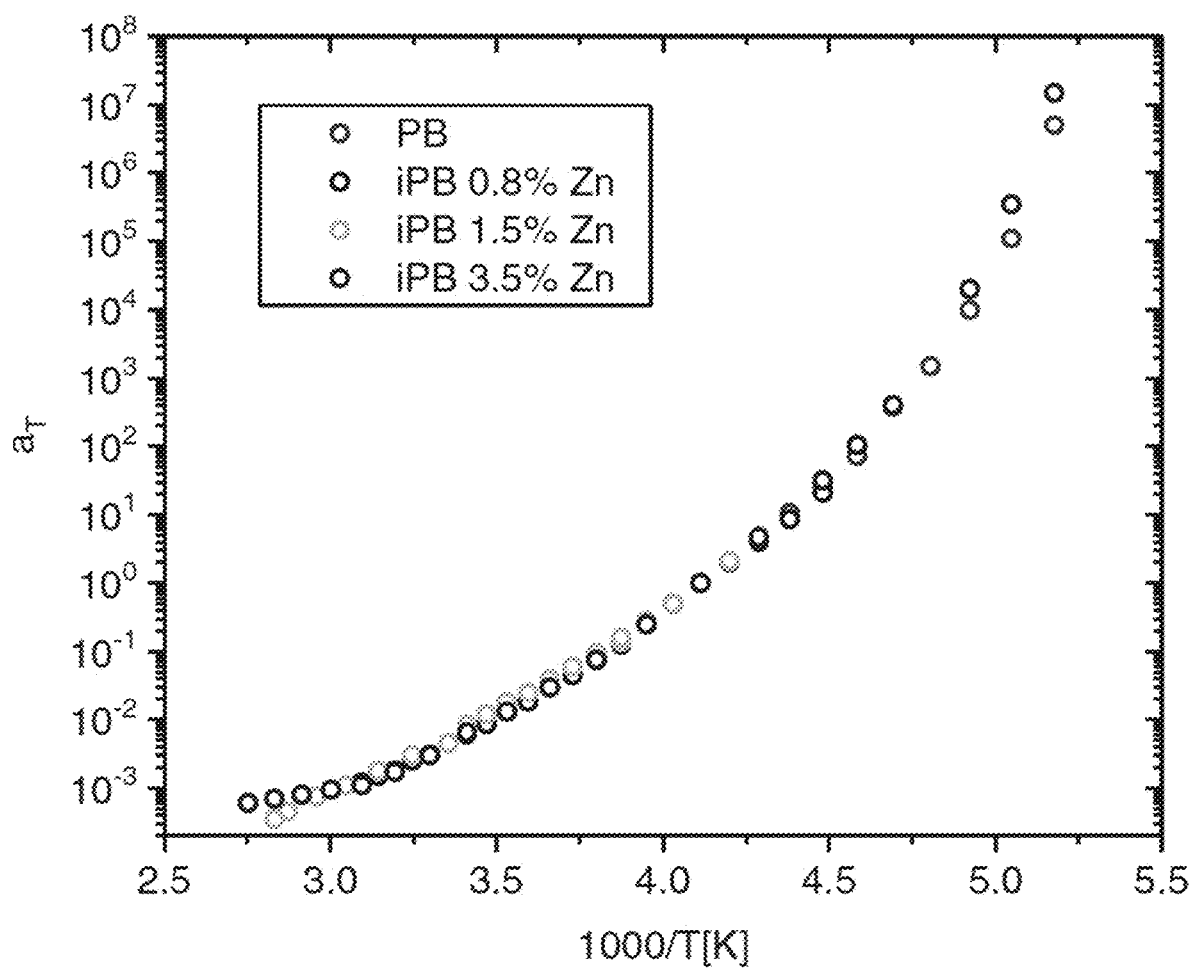
FIG. 7 shows the temperature dependence of the shift factor $a_T$ from G' and G".

Notwithstanding the large difference in $G^*(\omega)$ for the iPB ionomers with respect to the neat PB, upon comparing the temperature dependence of the shift factor $a_T$ for the different materials (FIG. 7), very small difference was found between all materials. This is an indication that the ionic bonds have a little effect on the dynamics of the polymer segments of PB, which is consistent with the very small change of $T_g$. Thus, the rheological measurements show that the ionic bonds do not alter the local chain dynamics (segmental dynamics) even if they block the chain diffusion as evidenced in FIG. 6.

Figure 8:
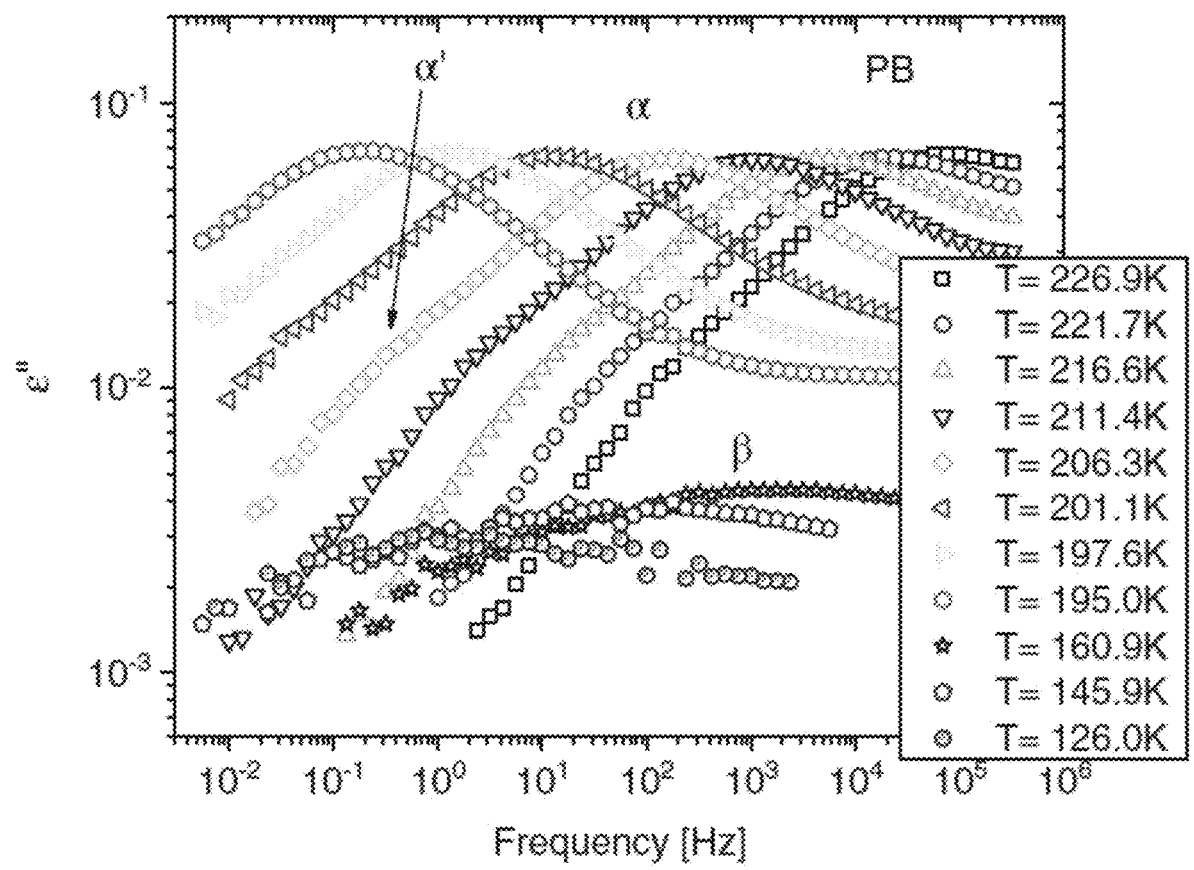
FIGS. 8 and 9 show dielectric loss spectra at various temperatures for neat PB (FIG. 8) and iPB ionomer with 3.5% Zn (FIG. 9). The temperatures of each spectra are reported in the legend. The spectra above the glass transition are dominated by the α-process, and the β-process is evident well below the glass transition.
Figure 9:
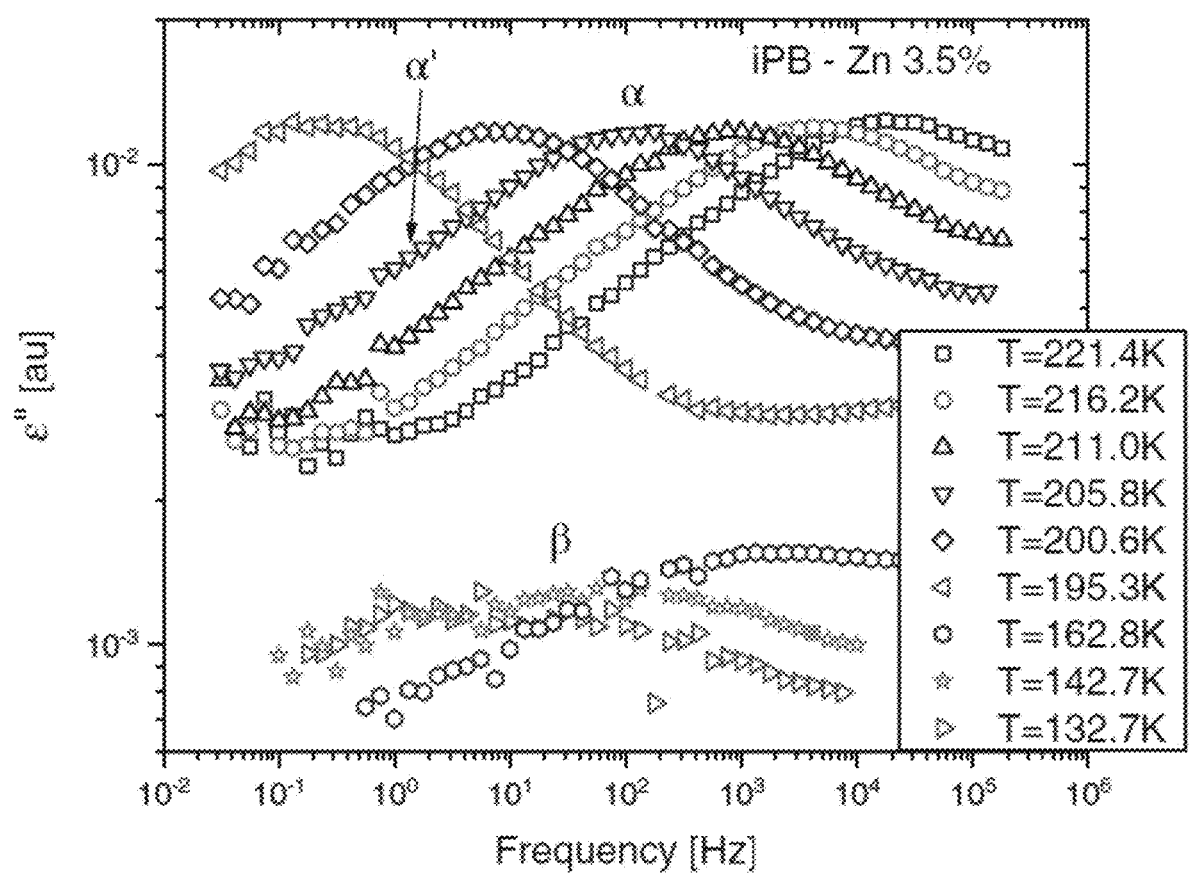

Broadband dielectric spectroscopy—The dielectric constant $\varepsilon^*(\omega)=\varepsilon'(\omega)-i\varepsilon''(\omega)$ for neat PB and two iPB ionomer with 1.5% and 3.5% Zn was measured over a broad range of temperatures. The dielectric spectra (FIG. 8) above $T_g$ show mainly the presence of the segmental relaxation (or α-process). The β-process is evident mostly below $T_g$ because its intensity is much smaller than that of the α-process. The βprocess is generally attributed to local non-cooperative motions of the segments, and is often identified as a Johari-Goldstein relaxation. Less evident is a small shoulder in the low frequency flank of the α-process, which could be due to the presence of both 1,2 and 1,4 repeating units in the PB polymer. Since 1,2-PB and 1,4-PB have very different glass transitions (272 and 178 K, respectively, Hofmann et al., *Macromolecules* 29, 129 (1996)), their different dynamics could in principle be apparent in this case as a second glass transition. However, two glass transitions have been only being reported for block copolymers of 1,2-PB and 1,4-PB in the case of microphase separation (Quan et al., *Macromolecules* 24, 4701 (1991)). This low-frequency shoulder cannot be attributed to the presence of the ionomer moiety, because it is also present in the neat PB. Another possible explanation of this shoulder at lower frequency is the presence of a normal mode (chain dynamics); however, this has not been reported to date. The presence of a normal mode in the dielectric spectra requires the presence of a dipole along the chain (Adachi et al., *Prog. Polym. Sci.* 18, 585 (1993); Hirose et al., *Non-Cryst. Solids* 352, 4758 (2006); Casalini et al., *Macromolecules* 38, 1779 (2005)) that in principle is not present in PB, although the separation is not significantly different from what would be expected for the $M_w$ of the investigated polymer. A dipole along the chain is not expected for neither the 1,2-PB or the 1,4-PB structure; however, a possible cause for the presence of a dipole along the chain could be the asymmetry of the two structures. A potential way to clarify the presence of a normal mode would be to verify whether for a higher $M_w$ polymer, the two peaks will be more separated in the frequency domain. In other ionomers, an additional peak at low frequency attributed to the ionic bond has been observed (Castagna et al., *Macromolecules* 44, 2791 (2011)) (amplitude increase with the number of ionic bonds); however, no additional relaxation peaks due to the ionic bonds were observed in the measurements. At high temperatures, the spectra were dominated by DC conductivity of impurities, with the conductivity being smaller in the ionomers than in the initial PB.

To analyze the spectra, a linear superposition of two Kohlrausch-Williams-Watts (KWW) and one Cole-Cole (CC) function (Kremer F, Schonhals A, Eds.; *Broadband Dielectric Spectroscopy*; Springer: Berlin (2003)) was used $$\varepsilon^*(\omega) = \Delta\varepsilon_{\alpha'}L_{i\omega}\left[-\frac{d\phi_{\alpha'}(t,\tau_{\alpha'})}{dt}\right] + \Delta\varepsilon_{\alpha}L_{i\omega}\left[-\frac{d\varphi_{\alpha}(t,\tau_{\alpha})}{dt}\right] + \frac{\Delta\varepsilon_{\beta}}{1+(i\omega\tau_{\beta})^{1-\alpha_{cc}}} + \varepsilon_{\infty}$$

where $\Delta\varepsilon$ is the dielectric strength, $\tau$ is the relaxation time, $\alpha_{cc}$ is the shape parameter of the CC function, $\varepsilon_{\infty}$ is the relaxed dielectric constant, and $\varphi(t)$ is the KWW function $$\varphi(t) = \exp\left[-(t/\tau)^{\beta_{KWW}}\right]$$

where $\beta_{KWW}$ is the stretching parameter ($0 < \beta_{KWW} \le 1$).

Figure 10:
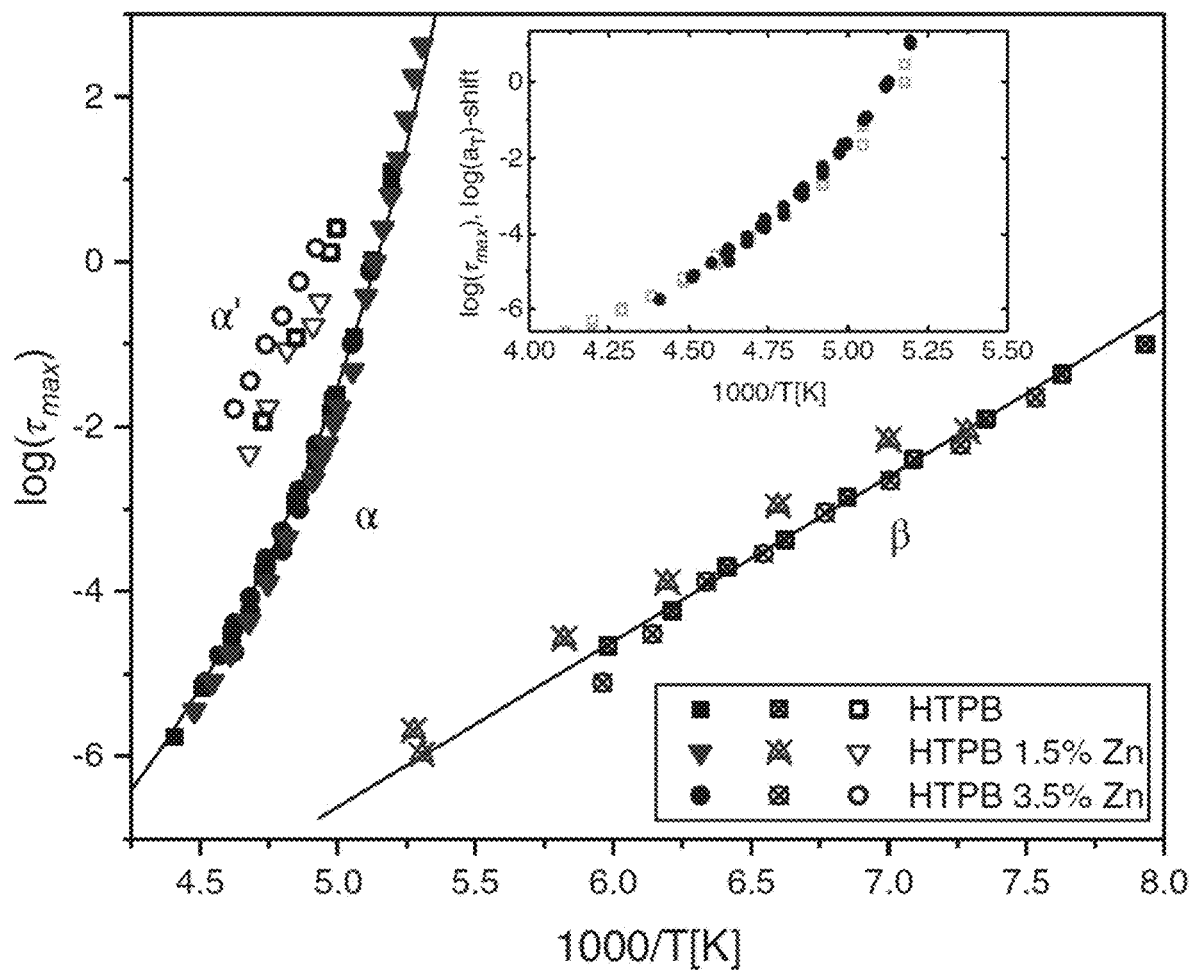
FIG. 10 shows temperature dependence of the relaxation time for the α' (open symbols), α (solid symbols), and β-process (open symbols with cross) determined from the fit to the dielectric spectra of the neat PB (squares) iPB ionomer with 1.5% Zn (triangles) and the iPB ionomer with 3.5% Zn (circles). The solid lines are the best fit to the data with a VFT equation and an Arrhenius equation. Inset: comparison of the temperature dependence of the α-process with the shift factor $a_T$ from the mechanical measurements. Note that to determine $a_T$, the reference temperature was 243.15 K and the $a_T$ data were shifted by the value of $\tau_\alpha$ at that temperature.

The relaxation times $\tau_{\alpha'}$, $\tau_{\omega}$, and $\tau_{\beta}$ determined from the best fit to the spectra are reported in FIG. 10. (Note that the proximity and small amplitude of the $\alpha'$ make the error on $\tau_{\alpha'}$ quite large.) It was found that the dynamics of the $\beta$-process remains unaltered by the introduction of the ionic moiety, which is consistent with the mechanical measurements and the DSC measurements of $T_g$. Additionally, dielectric measurements show that also the dynamics of the $\alpha'$ and secondary $\beta$-process remain unchanged within the experimental error.

The temperature dependence of the $\tau_{\beta}$ is well described with an Arrhenius equation, $$\tau_{\beta}(T) = \tau_{\beta}^{\infty}\exp\left(\frac{E_{\beta}}{kT}\right)$$

with a constant activation energy $E_{\beta}$, where k is the Boltzmann constant and $\tau_{\beta}^{\infty}$ is the high temperature limit of $\tau_{\beta}$. In the best fit to the $\tau_{\beta}(T)$ (solid line in FIG. 10) it is found that $E_{\beta}=35.6\pm0.8$ kJmol$^{-1}$ and $\log(\tau_{\beta}^{\infty})=-15.7\pm0.3$.

The temperature behavior of $\tau_{\alpha}$ is characterized by an activation energy increasing with decreasing temperature, which is well described by a Vogel-Fulcher-Tamman (VFT) function $$\tau_{\alpha}(T) = \tau_{\alpha}^{\infty}\exp\left(\frac{B}{T-T_0}\right)$$

where $\tau_{\alpha}^{\infty}$ is the high temperature limit of $\tau_{\alpha}$, B is a constant, and $T_0$ is the Vogel temperature. According to the VFT equation at the temperature $T_0$, $\tau_{\alpha}$ is supposed to diverge. However, this divergence cannot be observed, because below $T_g$ the system cannot reach equilibrium, and often a deviation from the VFT is observed (Casalini et al., *Phys. Rev. Lett.* 102, 035701 (2009)). From the best fit of the VFT (solid line in FIG. 10) to the $T_{\alpha}$ data above $T_g$, $\log(\tau_{\alpha}^{\infty})=-13.0\pm0.1$, B=1260±10K and $T_0=153\pm1$ K.

The temperature dependence of $\tau_{\alpha}$ is in very good agreement with that of the shift factor from mechanical measurement $a_T$, as shown in FIG. 10. Thus, both dielectric and mechanical measurements indicate that the temperature dependence of the mechanical measurements is controlled by the segmental dynamics of PB, which in turn is largely uninfluenced by the ionic bonds between the chains. This "lack" of effect can be attributed to the high flexibility of the PB chain and of the side chains. Thus, the formation of ionic bonds prevents the chain diffusion (increase of viscosity), but it does not hinder the local rearrangements of the chain segments as evident by the absence of a change observed for both $\tau_{\alpha}$ and $\tau_{\beta}$. This behavior is different from that of covalent PB networks in which the temperature dependence of $\tau_{\alpha}$ was found to change with increasing crosslinking density, probably due to the higher rigidity of the covalent crosslinks (Roland et al., *J. Chem. Phys.* 123, 204905 (2005); Roland, *Macromolecules* 27, 4242 (1994); Casalini et al., *J. Chem. Phys.* 131, 114501 (2009)).

The dynamics of new elastomeric ionomers based on low-molecular-weight PB were investigated using a combination of DSC, rheology, and broadband dielectric measurements. It was found that the introduction of the zinc-based ionic bonds has a large effect on the rheological properties of the PB, which are comparable with those expected in the case of covalent crosslinks. However, the presence of the ionic bonds has only minute effects on the segmental dynamics of the iPB, with small changes of the glass transition (<0.5 K) and no evident changes in the steepness index of PB. Thus, even if the long range motions of the chains are blocked by the presence of the ionic crosslinks, the local segmental (and secondary) dynamics remain unaffected. Owing to the high strength of the ionic interactions, the lifetimes of the ionic bonds are so large that dissociation was not observed in the investigated range of the frequency even at high temperatures. This absence is consistent with the low-temperature sensitivity of the zinc-oxygen coordination observed for similar zinc ionomers (Farrell et al., *Macromolecules* 33, 7112 (2000)).

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A method comprising:
   providing a solution comprising a solvent, a polybutadiene, and an acrylate;
      wherein the acrylate and the polybutadiene are dissolved in the solvent; and
   functionalizing the polybutadiene with the acrylate to produce a polymer;
      wherein the acrylate comprises ionic groups or groups capable of hydrogen bonding to each other;
      wherein the polymer comprises the ionic groups or the groups capable of hydrogen bonding to each other.

2. The method of claim 1, wherein the solvent comprises chloroform and ethanol.

3. The method of claim 1, wherein the acrylate is zinc acrylate, magnesium acrylate, or hydroxyethylacrylate.

4. The method of claim 1, further comprising:
   evaporating the solvent.

5. The polymer made by the method of claim 1.

6. The polymer of claim 5, wherein the polymer contains an average of more than zero and up to 3 functional groups per polymer chain.

7. A method comprising:
   combining the polymer of claim 5 with a crosslinker to produce a printing composition;
   extruding the printing composition to form a shaped article; and
   crosslinking the polymer with the crosslinker.

8. The method of claim 1, wherein the functionalization occurs by reaction of a double bond of the acrylate with a double bond of the polybutadiene.

* * * * *